Aug. 21, 1934.  F. D. BUTLER  1,970,555
MOTHER CRANK BEARING ASSEMBLY
Filed Nov. 4, 1931  2 Sheets-Sheet 1
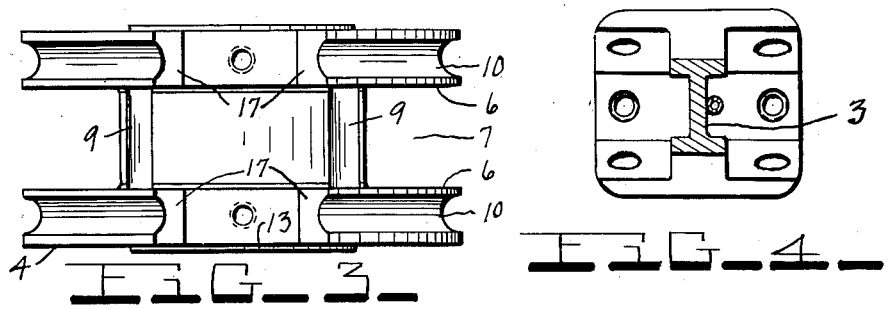
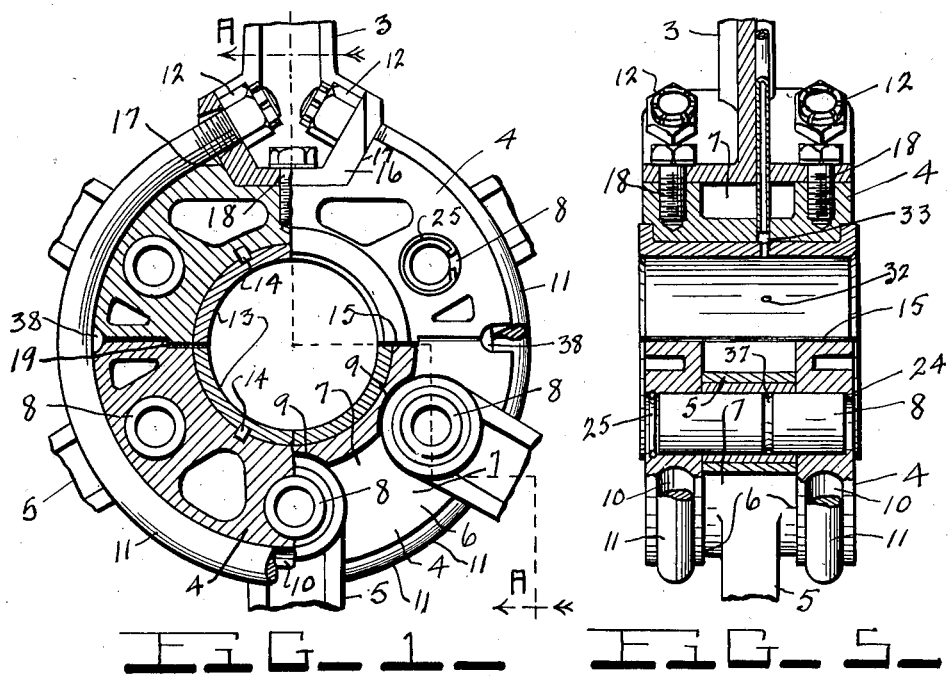
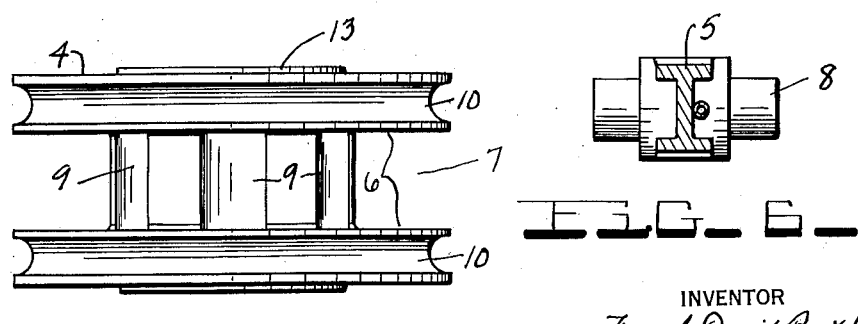
INVENTOR
Frank David Butler
BY
Robert A. Lavender
ATTORNEY Aug. 21, 1934.   F. D. BUTLER   1,970,555
MOTHER CRANK BEARING ASSEMBLY
Filed Nov. 4, 1931   2 Sheets-Sheet 2
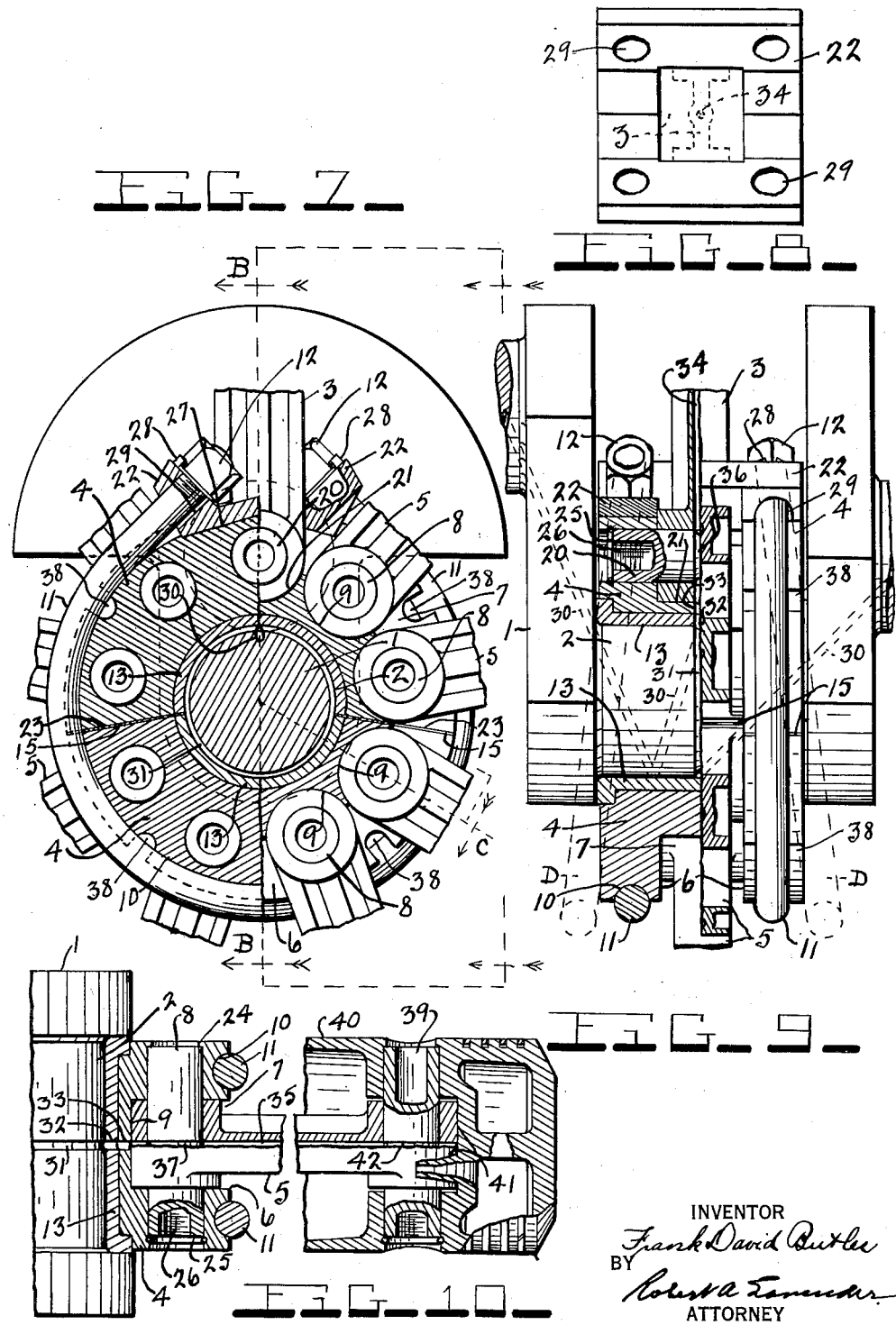

Patented Aug. 21, 1934

1,970,555

UNITED STATES PATENT OFFICE 1,970,555

MOTHER CRANK BEARING ASSEMBLY

Frank David Butler, United States Navy, Bremerton, Wash.

Application November 4, 1931, Serial No. 573,012

12 Claims. (Cl. 74—580)

(Granted under the act of March 3, 1883, as amended April 30, 1928; 370 O. G. 757)

My invention relates particularly to engines in which the connecting rods are disposed about a common crank shaft and in which a mother crank bearing is provided with a master or mother connecting rod rigidly attached thereto, and wherein the feet of a plurality of secondary connecting rods are oscillatably mounted in the periphery of said mother crank bearing.

The main object of my invention is to provide an adjustable mother crank bearing and a detachable mother connecting rod assembly wherein bearing tie screws circumscribe the periphery of said bearing, or a portion thereof, and are utilized for assisting in rigidly securing said connecting rod to said bearing.

The final object of my invention is to produce a bearing of the type mentioned which is exceedingly simple in construction, efficient in operation, durable in use, and which may be readily and conveniently adjusted, assembled and taken apart.

To the accomplishment of the foregoing and such other objects as may hereinafter appear, my invention consists in the combination, arrangement and construction of parts hereinafter described, pointed out in the appended claims and illustrated in the accompanying drawings forming a part hereof, it being understood that various changes may be made in practice within the scope of the appended claims, without digressing from my inventive idea or sacrificing any of the advantages of the invention.

Two of the many possible embodiments of my invention are illustrated in the accompanying drawings, in which:—

Figure 1 is a broken away end elevation and transverse section of one method of constructing a mother crank bearing assembly according to my invention; Figure 2 is a partially assembled plan view of the lower half of Fig. 1; Fig. 3 is a partially assembled plan view of the upper half of Fig. 1; Fig. 4 is a broken away partially assembled plan view of the mother connecting rod illustrated in Fig. 5; Fig. 5 is a view of Fig. 1 taken on the dotted and broken line A—A of the latter; Fig. 6 is a plan view of the lower secondary connecting rod illustrated in Fig. 5 and includes the foot wrist pin of said rod; Fig. 7 is similar to Fig. 1 except illustrating a modified construction of a mother crank bearing assembly according to my invention; Fig. 8 is a plan view of the mother connecting rod retainer collar illustrated in the upper portion of Fig. 9; Fig. 9 is a partially assembled side elevation and section of Fig. 7 taken on the dotted and broken line B—B of the latter; and Fig. 10 is a section taken on the dotted line C—C of Figure 7.

With reference to the symbols of the drawings, similar numerals represent and indicate similar parts in the several views, the numeral 1 indicates the engine crank shaft which is mounted and adapted to rotate in the engine crank case in the usual manner and has the crank journal 2 forming an integral part thereof. The numeral 3 indicates the master or mother connecting rod which is adapted to be rigidly secured to the upper half of the pair of semi-circular shaped main body portions 4 which latter form the main units of the mother crank bearing assembly. The plurality of secondary connecting rods 5 are suitably spaced around the center of the axis of the crank journal 2 and suitably mounted between the side walls 6 of the rectangular shaped recess 7 the pivot points of which latter are spaced at intervals about the assembly of the main body portions 4, the said rods 5 each being pivotally mounted thereon at the foot end by a wrist pin 8 and circumferentially mounted in the semi-circular shaped circumferential bearing sockets 9 which latter are machined in the base of the recess 7 and which pins 8 are suitably mounted in the side walls 6 of the main body portions 4 and extend across the recess 7. The assembly of the semi-circular main body portions 4 are equipped with the semi-circular shaped recesses 10 which latter extend around the periphery and are disposed near the ends of the former, the portions 4 being rigidly secured together by the tie screws 11 which latter are mounted in the recesses 10 and are drawn tightly secure by the nuts 12. The renewable anti-friction metal crank bearing liners 13 are suitably mounted in the assembly of the main body portions 4 and are retained from revolving by the dowel pins 14, said bearing liners 13 being adjustable to the crank journal 2 by increasing or decreasing either the thickness or the number of the adjustment shims 15.

With reference to Figures 1 to 6 inclusive, the master or mother connecting rod 3 is illustrated as having an integral blunt wedge shaped keying portion 16 at its inner or foot end, said portion 16 being adapted to fit snugly in a similar shaped recess or groove 17 disposed transversely in the upper side of the upper main body portion 4, said rod 3 being rigidly secured in said groove 17 and to said upper main body portion 4 by the bearing tie or clamp bolts 11 and the secondary securing screws 18. Screws 11 fit in their respective grooves 10 and their threaded ends pass through openings in portions 16 of rod 3 and are provided with nuts 12 to clamp together bearing portions 4 and further clamp the wedge-shaped end 16 of rod 3 in the correspondingly shaped recess 17 in the adjacent bearing portion 4. With further reference to the last mentioned figures, the main body portions 4 are retained in line with each other by the snug fit of the tie or clamp screws 11 in the grooves 10, and by the rabbet joint 19, the latter being located between said portions 4.

With reference to Figures 7 to 10 inclusive, a modification in the construction and method of securing the master or mother connecting rod 3 to the mother crank bearing is illustrated, said rod being shown in these figures as being mounted in one of the main body portions 4 in a similar manner to that of the secondary connecting rods 5 except that said rod 3 is rigidly secured to said member 4 by the combination of the retainer pin 20, the retainer pocket 21 and the retainer collar 22, the latter being a drive fit over the I-beam section of the foot end of said rod 3 and being rigidly secured to said last mentioned member 4 in a manner that will be described later. Continuing with reference to the last mentioned figures, the main body portions 4 are retained in line with each other in their assembly by the combination of the snug fit of the bearing tie screws 11 in the grooves 10, and the diagonal joints 23 which latter are located between said members 4 and are considered an improvement over the rabbet joint 19 which latter is illustrated in Figure 1. With further reference to Figures 7 to 10 inclusive, a few of the details of the bearing assembly construction are as follows: The retainer pin 20 and wrist pins 8 are retained in place lengthwise by the shoulders 24 and retainer springs 25 and may be conveniently removed from the members 4 by inserting a draw bolt in the threaded portions 26; the pins 8 and the feet of the rods 5 should ordinarily be hardened and their bearing surfaces ground to fit; the retainer collar 22 is a snug fit on the conical shaped projection 27 which latter extends transversely across the upper portion of the upper member 4, said collar 22 being held securely down on said projection and against said member 4 by the bearing tie screws 11 which latter combined with said collar tend to reinforce the periphery of the assembly of the main body members 4, the tie bolt securing nuts 12 being locked by the flanged retainer washers 28, and the tie bolt holes 29 in the collar 22 being slightly elongated for purposes connected with adjusting the crank bearing which latter will be described later; and, the mother crank and connecting rod bearing assembly is lubricated from the crank shaft lubrication system via, the angular drilled holes 30 and annular groove 31 in the crank shaft 1, the radial holes 32 and 33 in the liners 13 and members 4 respectively, the longitudinal holes 34 and 35 in the connecting rods 3 and 5 respectively, and the annular grooves 36 and 37 in the pins 20 and 8 respectively.

With reference to Figures 7 and 9 in particular, the liners 13 may be readjusted to the crank journal 2 in the following manner: Place the crank journal 2 on its bottom dead center as in the position illustrated, loosen the nuts 12, insert taper drift pins in the drift pin slots 38 and tie screws 11 over the outer side walls of the grooves 10 to the positions illustrated in the dotted outlines D—D of the latter figure, make necessary adjustment to shims 15 after prying the main body portions 4 apart, and then proceed to reassemble, it being apparent that the liners 13 may be renewed during the adjustment operation.

The construction of the mother crank bearing assembly as illustrated in Figures 7 to 10 inclusive is considered better in some cases than that illustrated in the preceding figures for the following reasons; first, all connecting rods may be removed from the bearing assembly without interfering with the bearing tie screws 11; second, all of the connecting rods may all be made uniform; and third, the shims 15 may be more conveniently adjusted.

With reference to Figure 10, the combined socket and pivot oscillating joint for radial connecting rods is illustrated as applied to the outer or piston end of one of the rods and the construction and lubrication of the combined joint is as follows: The outer wrist pin 39 of the rod 5 is mounted in the piston 40 which latter is equipped with the semi-circular shaped socket bearing 41 which in turn is adapted to fit the periphery of the extreme outer end of said rod 5; and, the lubrication of said combined joint is accomplished by oil being supplied from the crank shaft lubricating system via the longitudinal hole 35 in the rod 5 and the annular oil groove 42 in the pin 39.

The type of mother crank and connecting rod bearing assembly described herein is especially adaptable to heavy duty, continuous service, radial, internal combustion, oil engines wherein the cylinder combustion pressures are extremely high, and wherein the crank shaft, either of the single or plural throw type, is built in an integral unit.

The invention herein described may be manufactured and used by or for the Government of the United States of America for governmental purposes without the payment to me of any royalty thereon or therefor.

Having fully described my invention, what I claim as new and desire to secure by Letters Patent is:—

1. A mother connecting rod assembly comprising a bearing member for engaging a crank and having a portion provided with wedge-shaped surfaces, a plurality of connecting rods one of which is the mother connecting rod, means for pivotally connecting said member to a connecting rod which is not the mother connecting rod, and means including a portion having wedge-shaped surfaces associated with the mother connecting rod and coacting with said surfaces of said member for rigidly and removably securing the mother connecting rod to said member by holding said wedge-shaped surfaces in rigid contact.

2. A connecting rod assembly comprising a mother and associate connecting rods, a bearing member formed in two parts with a bearing for a crank intermediate the parts, and said member having separate bearings for at least one of said connecting rods and a recess in the outer surface of said member, said mother connecting rod having an end portion extending into and adapted to contact with a wall of said recess; tie rods bent about said crank bearing member on opposite sides, and extending about the greater portion of the periphery of said member on opposite sides of said mother and associated connecting rods, and having the free ends of said bent rods adjacent the mother connecting rod at points on opposite sides of and above its end extending into said recess, and means cooperating with the ends of said bent rods for holding the mother connecting rod rigid in contact with a wall of said recess.

3. The connecting rod assembly of claim 2, wherein its bearing member is characterized by having mounted in registering recesses in its two parts an anti-friction liner fitting the crank of a crank shaft.

4. The connecting rod assembly of claim 2, wherein said recess and the end portion of the mother connecting rod extending thereinto each being characterized as having substantially wedge-shaped surfaces, and said cooperating means being characterized as screw means for securing together said wedge-shaped surfaces.

5. The connecting rod assembly of claim 2, characterized by said recess and the end portion of the mother connecting rod extending thereinto, each having corresponding wedge-shaped lateral surfaces and an intervening blunt surface, and said means including portions rigid on the mother connecting rod through which rigid portions the bent rod ends extend and nuts threaded on the bent rod ends and against said rigid portions for keying the mother connecting rod to said bearing by rigidly holding said surfaces together.

6. A mother connecting rod assembly comprising a bearing for engaging a crank, a plurality of connecting rods, a pivot pin connecting one end of each of said rods to said bearing, a lug adapted to engage the end of one of said connecting rods at a point above said pin to hold said rod rigid on said pin and with said bearing, and means for securing said lug to said bearing.

7. A mother connecting rod assembly comprising a bearing for engaging a crank and having a recess therein, a mother connecting rod having a portion engaging a wall of said recess, a lug engaging said rod and bearing to hold the end of said rod rigid in said recess, and means for securing said lug to said bearing.

8. A mother connecting rod assembly comprising a bearing for engaging a crank and having a recess therein, a mother connecting rod having a portion adapted to engage a wall of said recess, a lug engaging said rod for holding it rigid in said recess, means for positioning said lug on said bearing, and means extending about said bearing for securing said lug in its position on said bearing.

9. The connecting rod assembly of claim 8 characterized by the adjacent surfaces of said lug and bearing being provided with engaging walls of a recess and projection for positioning the lug on said bearing.

10. The connecting rod assembly of claim 2 characterized by said recess and the end portion of the mother connecting rod extending thereinto, each having corresponding wedge-shaped lateral surfaces and an intervening blunt surface, a screw passing through the portion having said blunt surface for securing the connecting rod to the bearing member, and the cooperating means being characterized as including screw threads on the bent rod ends and nuts thereon for supplementing the securement of the connecting rod.

11. A mother connecting rod assembly for radial engines comprising a bearing member adapted to engage a crank, a plurality of connecting rods each being of like shape at their crank ends and having a separate pivotal connection to said member at points substantially within the contour of said member, and means fixed on the outer surface of said member and engaging opposite sides of one of the connecting rods for holding the engaged one of said connecting rods rigid on its pivotal connection and converting said engaged rod into the mother connecting rod.

12. A mother connecting rod assembly for radial engines comprising a bearing member formed in two parts having a bearing for a crank between said two parts, a plurality of connecting rods each being of like shape at their crank ends and having a separate pivotal connection to said member at points substantially within the contour of said member, an element on said member and extending around engaging opposite sides of one of the connecting rods for holding the engaged one of said connecting rods rigid on its pivotal connection and converting the engaged rod into the mother connecting rod, said member and element being provided with a cooperating recess and projections and means extending about the bearing member and secured to said element for holding said element fixed in its engaging position and the parts of the bearing member together.

FRANK DAVID BUTLER.